United States Patent [19]
Kim et al.

[11] Patent Number: 5,787,293
[45] Date of Patent: Jul. 28, 1998

[54] COMPUTER INCORPORATING A POWER SUPPLY CONTROL SYSTEM THEREIN

[75] Inventors: Ki-Hong Kim; Jean-Gee Hong; Seong-Sik Ham; Chang-Hun Choi, all of Incheon, Rep. of Korea

[73] Assignee: Daewoo Telecom Ltd., Incheon, Rep. of Korea

[21] Appl. No.: 749,027

[22] Filed: Nov. 14, 1996

[30] Foreign Application Priority Data

| Apr. 24, 1996 | [KR] | Rep. of Korea | 1996-12601 |
| Jun. 3, 1996 | [KR] | Rep. of Korea | 1996-19673 |
| Sep. 18, 1996 | [KR] | Rep. of Korea | 1996-40722 |

[51] Int. Cl.$^6$ ................................................. G06F 1/26
[52] U.S. Cl. ............................................... 395/750.01
[58] Field of Search ...................... 395/750.01–750.08, 395/651, 652, 284, 182.22

[56] References Cited

U.S. PATENT DOCUMENTS

| 5,151,855 | 9/1992 | Gray et al. | 395/750.07 |
| 5,167,024 | 11/1992 | Smith et al. | 395/750.04 |
| 5,446,904 | 8/1995 | Belt et al. | 395/750.05 |
| 5,497,772 | 3/1996 | Schulman et al. | 600/347 |
| 5,586,334 | 12/1996 | Miyazaki et al. | 395/750.01 |

*Primary Examiner*—Ayaz R. Sheikh
*Assistant Examiner*—Paul R. Myers
*Attorney, Agent, or Firm*—Pennie & Edmonds LLP

[57] ABSTRACT

A computer incorporates therein a control system for efficiently turning on and off a power supply on and off therein to control on-off operations of the computer. In the control system, a power detection signal is derived first based on a power selection signal generated when a power on/off key of the computer is actuated to control the on-off operations of the computer at a signal detector. And then, at a first generator, a first power control signal and a selection control signal are obtained from the derived power detection signal in response to a first mode control signal. Next, a second power control signal is derived from the power detection signal, the selection control signal and a second mode control signal at a second generator. Finally, the first and the second power control signals are logically combined at a second logic circuit to generate and provide a definitive power control signal to the power supply, thereby selectively supplying DC output voltages to designated components of the computer to control the on-off operations of the computer.

24 Claims, 3 Drawing Sheets

COMPUTER INCORPORATING A POWER SUPPLY CONTROL SYSTEM THEREIN

FIELD OF THE INVENTION

The present invention relates to a computer incorporating a power supply control system therein; and, more particularly, to a control system for effectively turning a power supply on and off to thereby control on-off operations of the computer.

BACKGROUND OF THE INVENTION

As is well known a conventional power supply is widely utilized in various electronic/electrical equipment including computers, wherein a plurality of DC voltages needed to perform a series of processes in a computer are supplied from the power supply connected to an AC input power to designated components within the computer. Once all the DC voltages needed are supplied to the designated components in the computer, it can be booted up by a user instruction following one of several booting algorithms well known in the art.

However, in such a conventional power supply provided in a computer, when the power supply is off, the computer will not be accessible from, e.g., other communication terminals. Further, if the power supply is turned off accidentally while the computer is running, data and running programs therein may be lost or corrupted.

SUMMARY OF THE INVENTION

It is, therefore, a primary object of the present invention to provide a computer incorporating therein a control system for effectively turning a power supply on and off to thereby control the on-off operations of the computer.

In accordance with one aspect of the invention, there is provided a computer incorporating therein a control system for controlling the operation of a power supply therein which supplies a plurality of DC output voltages to designated components of the computer to control on-off operations of the computer, wherein the control system comprises:

means for detecting a power selection signal, generated when a power on/off key of the computer is actuated to control the on-off operations of the computer, to provide a detected power selection signal as a power detection signal;

means for producing a first, a second and a third mode control signals when predetermined instructions corresponding to the signals are given by the computer user, respectively;

a first generation means, responsive to the first mode control signal, for generating a first power control signal and a selection control signal by using the power detection signal;

a second generation means, responsive to the selection control signal and the second and the third mode control signals, for generating a second power control signal by utilizing the power detection signal; and a combining means for logically combining the first and the second power control signals to generate a definitive power control signal and to provide it to the power supply, thereby selectively supplying the DC output voltages to the designated components of the computer to control the on-off operations of the computer.

In accordance with another aspect of the invention, there is provided a computer incorporating therein a control system for controlling the operation of a power supply therein which supplies a plurality of DC output voltages to designated components of the computer to control on-off operations of the computer, wherein the control system comprises:

a first detection means for detecting a first power selection signal, generated when a power on/off key of the computer is actuated to control the on-off operations of the computer, to provide a first detected power selection signal;

a second detection means for detecting a ringing signal, generated when a user of any one of remotely located communications terminals calls a receiving communications terminal coupled with the computer to initialize the operation of the computer, to produce a detected ringing signal;

means for producing a first, a second, a third and a fourth mode control signals when predetermined instructions corresponding to the signals are given by the computer user, respectively;

a first generation means, responsive to the first mode control signal, for generating a second power selection signal by using the detected ringing signal;

a first combining means for logically combining the first detected power selection signal and the second generated power selection signal to produce a power detection signal;

a second generation means, responsive to the second mode control signal, for generating a first power control signal and a selection control signal by employing the power detection signal;

a third generation means, responsive to the selection control signal and the third and the fourth mode control signals, for generating a second power control signal by using the power detection signal; and a second combining means for logically combining the first and the second power control signals to generate and provide a definitive power control signal to the power supply, thereby selectively supplying the DC output voltages to the designated components of the computer to control the on-off operations of the computer.

BRIEF DESCRIPTION OF THE DRAWINGS

The above and other objects and features of the present invention will become apparent from the following description of preferred embodiments with reference to the accompanying drawings, in which.

DETAILED DESCRIPTION OF THE PREFERRED EMBODIMENTS

Figure 1:
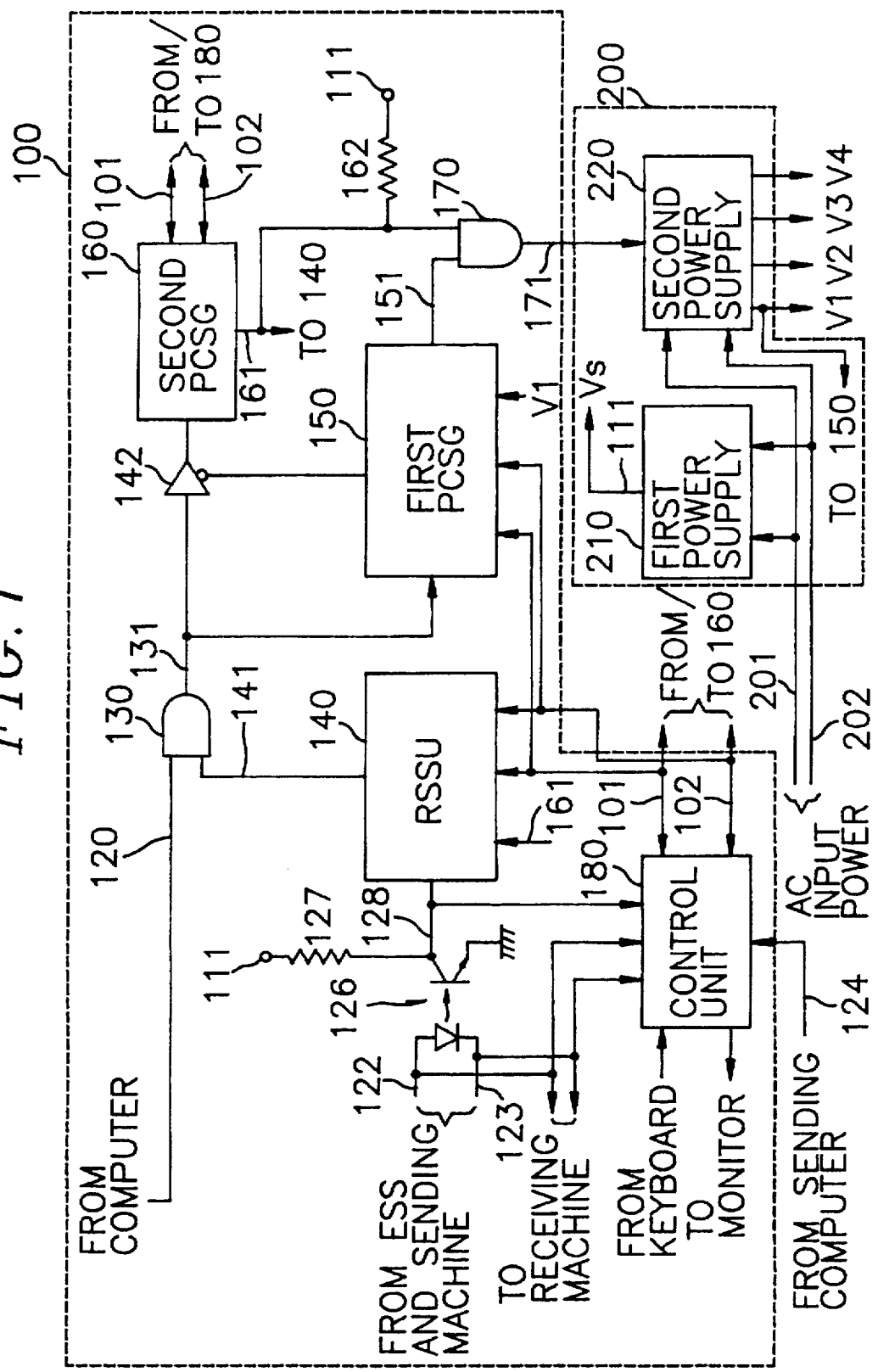
FIG. 1 shows a block diagram illustrating a novel control system in accordance with the invention.

Referring to FIG. 1, there is provided a block diagram of a novel control system 100 in accordance with the present invention for a power supply 200 in a computer (not shown). The inventive control system 100 comprises a power detection signal generator (PDSG) 130, a ringing signal selection unit (RSSU) 140, a first and a second power control signal generators (PCSG's) 150 and 160, a definitive power control signal generator (DPCSG) 170 and a control unit 180.

Once power lines 201 and 202 attached to the power supply 200 are connected with a power source (not shown), an AC input power is supplied via the lines to a first and a second power supplies 210 and 220 included in the power supply 200 irrespective of a current operation state of the computer. The first power supply 210 rectifies the AC input power from the power lines 201 and 202 by employing a conventional power rectifying method to generate a DC voltage Vs, e.g., +5V, to be used as a standby voltage in the inventive control system 100. The DC voltage Vs so generated is then supplied via a line 111 to designated components included in the control system 100, though it is not shown in FIGS. 1 to 3 for the sake of simplicity, so that they can be operated in a standby mode. The second power supply 220 selectively outputs a plurality of DC voltages, e.g., V1 to V4, using the AC input power provided through the lines 201 and 202 by using an inventive power control scheme which will be described in detail with reference to FIGS. 1 to 3 hereafter.

In the meanwhile, a first power selection signal PSS1 is applied via a line 120 to the PDSG 130, wherein the first power selection signal is generated by actuating a power on/off key (not shown) in the computer and used to selectively control on-off operations of the computer. For instance, if the power on/off key is pressed to initialize the computer operation, the power selection signal becomes logic low; and, if otherwise, logic high. It should be noted that a power on/off key on a remote controller of the computer may be used to provide the first power selection signal provided by that of the computer.

A second power selection signal PSS2 generated by the RSSU 140 from each of ringing signals transmitted from an electronic switching system (ESS) through telephone lines 122 and 123 and a photocoupler 126 coupled therebetween is also inputted to the PDSG 130 via a line 141. Specifically, when a remotely located telephone or facsimile user calls a receiver machine such as a telephone and a facsimile set (not shown) associated with the computer to communicate voice messages or data, each of ringing signals is sequentially generated from the ESS coupled with the receiver machine and sent via the lines 122 and 123 to the photocoupler 126 and the receiver machine.

The photocoupler 126, which is of a light emitting diode and a photo-transistor, detects each of the ringing signals applied thereto to provide a pulse signal of logic high and low states, wherein a resistor 127 having a very small resistance value is coupled between the collector of the photo-transistor and the line 111 to supply the DC voltage on the line 111 to the collector. In a preferred embodiment of the invention, it is designed that an output from the photo-transistor is a logic low pulse signal whenever each ringing signal is detected by the light emitting diode. The pulse signal so outputted is then provided via a line 128 to the control unit 180, and to the RSSU 140 that selectively outputs the second power selection signal PSS2 of a logic high and a logic low states via the line 141 to the PDSG 130.

Figure 2:
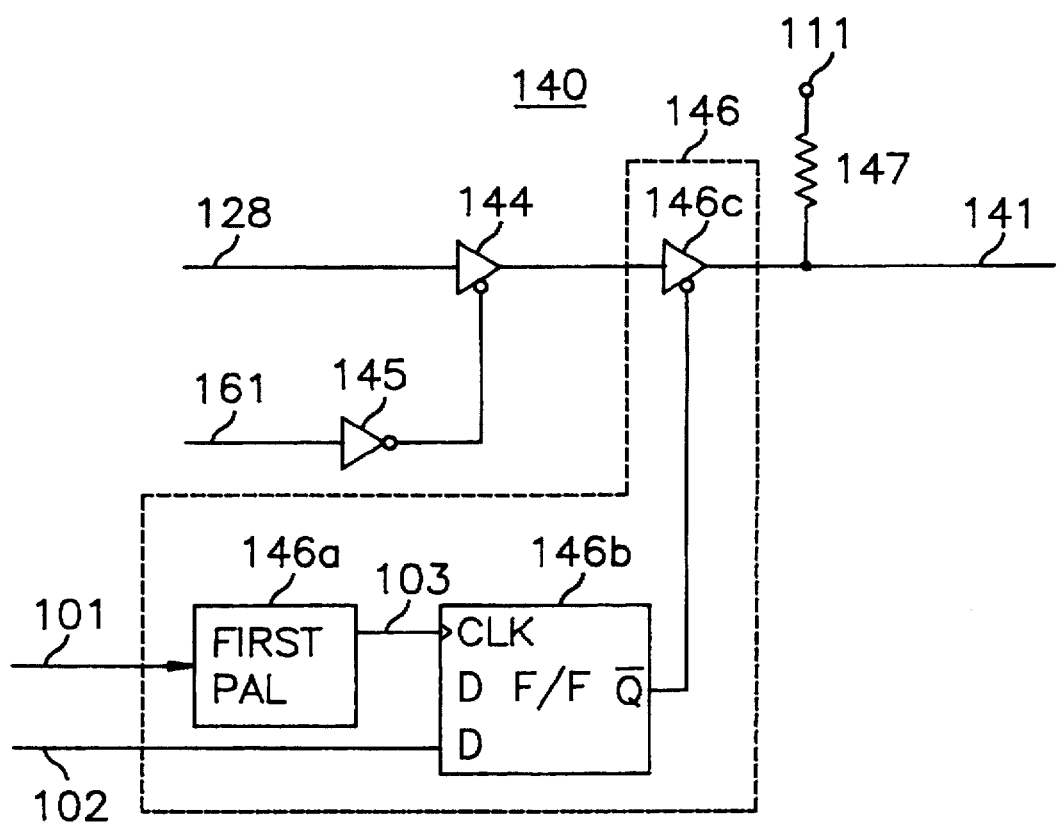
FIG. 2 presents a detailed block diagram of the ringing signal selection unit shown in FIG. 1.

The RSSU 140 shown in FIG. 1 includes a first tri-state buffer 144, an inverter 145 and a ringing signal selection circuit (RSSC) 146 and a detailed block diagram thereof is depicted in FIG. 2.

The first tri-state buffer 144 is enabled only if a firstly generated logic low pulse signal, indicating that a corresponding ringing signal has been detected, is applied from the photo-transistor thereto through the line 128; and disabled if otherwise, i.e., if any of the logic low pulse signals generated following the first, indicating the detection of the corresponding ringing signals, is inputted thereto. Specifically, the pulse signal from the photo-transistor is first inputted via the line 128 to an input of the first tri-state buffer 144 that selectively relays the inputted pulse signal to an input of the second tri-state buffer 146c depending on a first buffer control signal BCS1 from the inverter 145.

The first buffer control signal BCS1 can be derived by inverting a second power control signal PCS2 on a line 161 from the second PCSG 160 shown in FIG. 1. In other words, the second power control signal PCS2 on the line 161 is inverted by the inverter 145 to provide an inverted second power control signal IPCS2 to a gate of the first tri-state buffer 144 as the first buffer control signal BCS1.

In a preferred embodiment of the present invention, when the computer is not on or in a power off state, a default value or level of the second power control signal PCS2 is set to +5V or logic high at the PCSG 160. The default level of the second power control signal PCS2 is adaptively changed to a logic level which is adapted to control the operation of the computer based on the two power selection signals PSS1 and PSS2, a first address signal ADDS1 and a first data signal DATAS1 issued by the control unit 180 on a system address bus 101 and a system data bus 102. Details of the second power control signal PCS2 will be provided with reference to the second PCSG 160 and the control unit 180 shown in FIG. 1 later. It should be noted that all bit lengths of the first address signal, the first data signal, a second address signal, a second data signal, a third address signal and a third data signal which will be discussed later can be determined based on the required performance of the computer.

The first tri-state buffer 144 is enabled or disabled in response to the first buffer control signal BCS1 from the inverter 145, thereby selectively relaying the pulse signal from the line 128 to the RSSC 146. The RSSC 146, which includes a first programmable array logic (PAL) 146a and a first D flip/flop (D F/F) 146b and a second tri-state buffer 146c, selectively outputs the pulse signal from the first tri-state buffer 144 depending on a selection of the computer user.

Specifically, a second address signal ADDS2 issued by the control unit 180 on the system address bus 101 is applied to the first PAL 146a, while a second data signal DATAS2 issued by the control unit 180 on the system data bus 102 is provided to an input (D) of the first D F/F 146b. The first PAL 146a, which is one of programmable read only memories (PROM's) and may be made of a matrix of an OR array and an AND array (not shown), generates a logic high signal if one out of its many outputs, e.g., 103, is selected in response to the second address signal ADDS2, wherein the generated logic high signal is then provided to another input of the first D F/F 146b as a clock (CLK) signal.

The first D F/F 146b triggers only on each of positive-going transitions (PGT's) of the CLK signal, as indicated by a small triangle on the CLK input thereof. Output (/Q) from the first D F/F 146b may be set to a logic low or high level in advance by a selection of the computer user independent of a current operation state of the computer. Such user's selection may be achieved by pressing, e.g., a predetermined key on a keyboard (not shown) of the computer to set a level of the second data signal DATAS2 to the input (D) of the first D F/F 146b to be logic high or low on each of the PGT's. In a preferred embodiment of the present invention, for instance, if there is set for the RSSC 146 to be operated depending on the detected ringing signals, an output from the first D F/F 146b is logic low; and, if otherwise, logic high. The output from the first D F/F 146b is then fed to a gate of the second tri-state buffer 146c as a second buffer control signal BCS2.

If an input to the gate of the second tri-state buffer 146c is the second logic low buffer control signal BCS2, it is enabled; and, if otherwise, i.e., if the input to the gate of the second tri-state buffer 146c is the second logic high buffer control signal BCS2, it is disabled. If the second tri-state buffer 146c is enabled, the pulse signal from the first tri-state buffer 144 is relayed via a line 141 to the PDSG 130 shown in FIG. 1 as a second power selection signal PCS2; and, if otherwise, no signal is relayed to the PDSG 130. As shown in FIG. 2, for providing the DC voltage Vs on the line 111 to the PDSG 130 via the line 141 in case that the RSSC 146 is set to be operated irrespective of the detected ringing signals, a resistor 147 having a very small resistance value is connected between the lines 111 and 141.

Referring back to FIG. 1, inputs to the PDSG 130 are the first and the second power selection signals PSS1 and PSS2. The PDSG 130, which is of an AND gate, produces a logic high only if the two power selection signals are all logic high meaning a power off state; and a logic low having a very small interval if otherwise. Subsequently, the output from the PDSG 130 is relayed via a line 131 to a third tri-state buffer 142 and the first PCSG 150 as a power detection signal PDS.

At the first PCSG 150, a third buffer control signal and a first power control signal, BCS3 and PCS1, to be used in selectively executing a power on/off intention confirmation function are derived as described hereafter. The power on/off intention confirmation function herein used represents a function being processed by the control unit 180 when the first power selection signals PSS1 abruptly becomes logic low due to an unexpected pressing the power on/off key of the computer to halt the operation of the computer when it is running. A detailed description of the power on/off intention confirmation function will be given with reference to the second PCSG 160 and the control unit 180 later.

Figure 3:
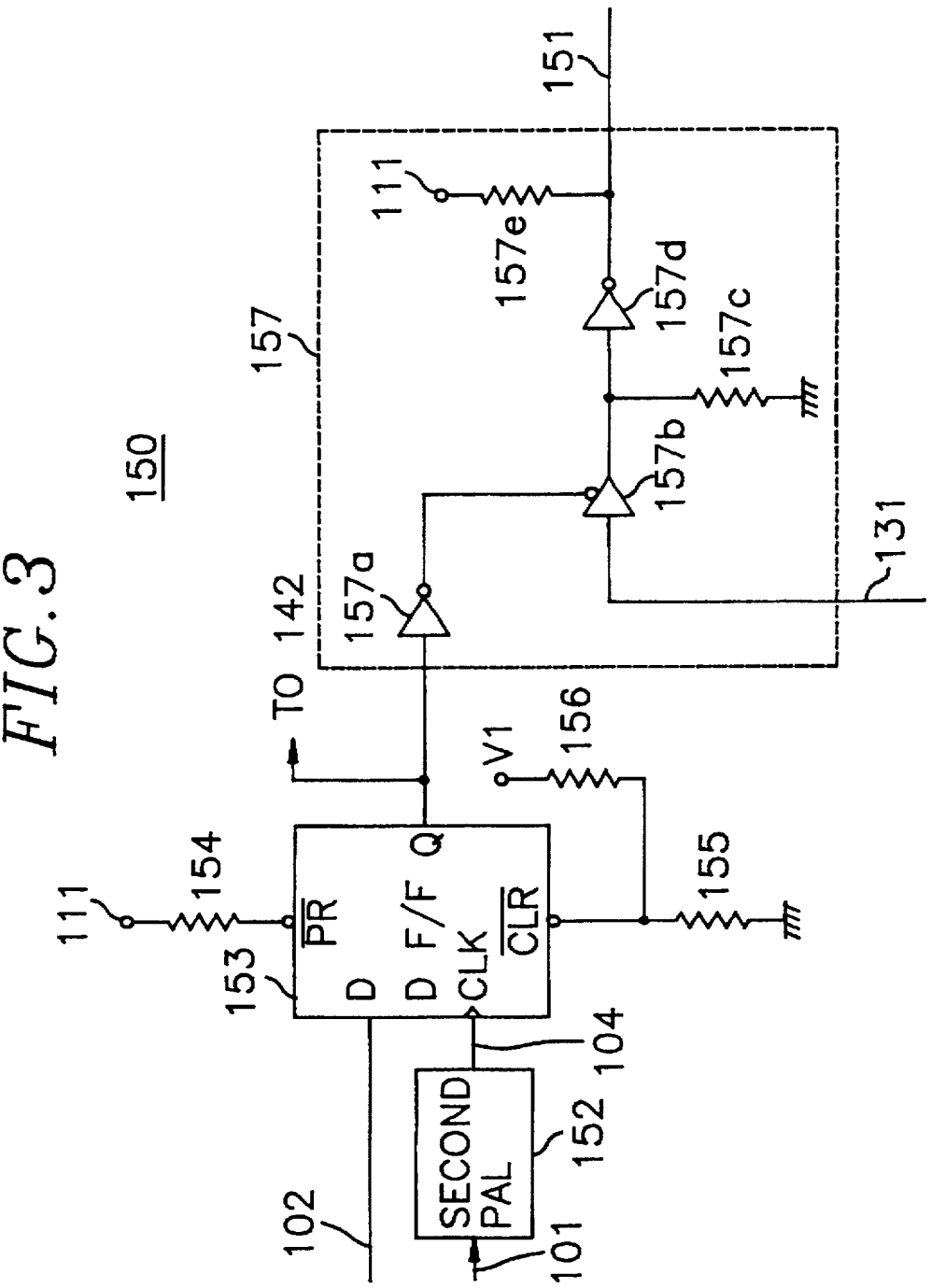
FIG. 3 offers a detailed block diagram of the first power control signal generator shown in FIG. 1.

Turning now to FIG. 3, there is provided an exemplary block diagram of the first PCSG 150 shown in FIG. 1. The first PCSG 150 includes a second PAL 152, a second D F/F 153 and a power control signal generation circuit (PCSGC) 157.

Specifically, the second PAL 152, which may be also made of a matrix of an OR array and an AND array (not shown), produces a logic high signal if one out of its many outputs, e.g., 104, is selected in response to a third address signal ADDS3 issued by the control unit 180 on the system address bus 101 to provide the same to another input of the second D F/F 153 as a CLK signal. The second D F/F 153 triggers only on each of PGT's of the CLK signal, as indicated by a small triangle on the CLK input thereof. As is well known, an output (Q) from the second D F/F 153 depends on a clocked operation if inputs to its preset (/PR) and clear (/CLR) ports are all logic high; and is determined based on the inputs to the /PR and the /CLR ports if otherwise. As shown in FIG. 3, two resistors 154 and 155 are coupled between the /PR port and the line 111 and between the /CLR port and the ground, respectively, while a resistor 156 is connected between an output line of the second power supply 220 for outputting the DC voltage V1 and the /CLR port. All the three resistors are used to stably supply the DC voltages Vs and V1 coupled to the line 111 and the output line of the second power supply 220 to the /PR and the /CLR ports of the second D F/F 153, respectively.

The second D F/F 153 will be cleared as the DC voltage V1 from the second power supply 120 will be 0 when the computer is in a power off state; and, therefore, in this case, the output (Q) therefrom will be logic low, wherein a third data signal DATAS3 issued by the control unit 180 on the system data bus 102 is don't care and is applied to an input (D) of the second D F/F 153. On the other hand, by properly changing a bit value of the third data signal DATAS3, the power on/off intention confirmation function can be selectively carried out when the computer is being operated or in a power on state. That is, in a preferred embodiment of the invention, if the power on/off intention confirmation function is set by the computer user, the third data signal DATAS3 is set to a logic low against the abrupt power off operation as described above wherein an output (Q) from the second D F/F 153 will be logic low; and, if otherwise, a logic high wherein the output (Q) therefrom will be logic high. The output (Q) from the second D F/F 153 is then relayed to the PCSGC 157, and, as the third buffer control signal BCS3, to the tri-state buffer 142 shown in FIG. 1.

The PCSGC 157, which includes two inverters 157a and 157d and a fourth tri-state buffer 157b, is advantageously utilized when the power on/off intention confirmation function is not set by the computer user, wherein an input to the inverter 157a of the PCSGC 157 will be a logic high signal. Specifically, the inverter 157a inverts the logic high signal from the second D F/F 153 to provide a logic low signal to a gate of the fourth tri-state buffer 157b as a fourth buffer control signal BCS4. In response to the fourth logic low buffer control signal BCS4, the fourth tri-state buffer 157b is enabled; and, accordingly, the power detection signal PDS from the PDSG 130 shown in FIG. 1 on the line 131 is relayed to the inverter 157d via a resistor 157c. The resistor 157c is employed to supply 0V or logic low signal coupled to the ground to the inverter 157d when the fourth tri-state buffer 157b is disabled in response to the fourth logic high buffer control signal BCS4 from the inverter 157b when the power on/off intention confirmation function is set by the computer user.

At the inverter 157d, the power detection signal PDS from the fourth tri-state buffer 157b or the logic low signal from the resistor 157c is inverted to an inverted power detection signal IPDS or a logic high signal to relay the same, as the first power control signal PCS1, to the DPCSG 170 shown in FIG. 1 via a line 151. For stably providing the output from the inverter 157d to the DPCSG 170 via the line 151, a resistor 157e having a very large resistance value is connected between the two lines 111 and 151.

As can be seen from the above, the first power control signal PCS1 on the line 151 is logic high if either the computer is in a power off state or the power on/off intention confirmation function is set by the computer user; and is determined based on the power detection signal PDS from the line 131 if otherwise.

Referring back to FIG. 1, the third tri-state buffer 142 selectively relays the power detection signal PDS from the line 131 to the second PCSG 160 in response to the third buffer control signal BCS3 from the second D F/F 153 shown in FIG. 3. Specifically, when the computer is in a power off state, the third tri-state buffer 142 is enabled in response to the third logic low buffer control signal BCS3 from the second D F/F 153; and, therefore, the power detection signal PDS from the line 131 is transferred to the second PCSG 160. However, when the computer is running, the third tri-state buffer 142 is enabled or disabled in response to the third buffer control signal BCS3 from the second D F/F 153, thereby selectively relaying the power detection signal PDS to the second PCSG 160. As can be seen from the above, such a selective relay operation is performed based on whether the power on/off intention confirmation function is set by the computer user or not.

The second PCSG 160, which may include several registers (not shown) widely used in the art, generates a second power control signal PCS2 based on the power detection signal PDS from the third tri-state buffer 142, the first address signal ADDS1 and the first data signal DATAS1 on the buses 101 and 102. The default level of the second power control signal PCS2 is +5V or logic high as mentioned above.

If the power detection signal PDS with a logic low value, indicating that the power on/off key has been actuated or a ringing signal has been detected, is provided from the third tri-state buffer 142 to the second PCSG 160 to initialize the computer operation when it is in a power off state, the default level of the second power control signal PCS2 is instantly changed to a logic low. The second logic low power control signal PCS2 is provided via a line 161 to the DPCSG 170 and the RSSU 140. For stably relaying the output from the second PCSG 160 to the DPCSG 170 through the line 161, a resistor 162 having a very large resistance value is coupled between the lines 111 and 161. Thereafter, the first logic high power control signal PCS1 from the first PCSG 150 through the line 151 and the second logic low power control signal PCS2 from the second PCSG 160 via the line 161 are synchronously provided to the DPCSG 170.

The DPCSG 170, an AND gate, produces a logic low signal from the two inputs applied thereto and provides the low logic signal, as a definitive power control signal DPCS of a logic low value, to the second power supply 220 via a line 171. In response to the logic low definitive power control signal DPCS, the second power supply 220 generates a plurality of DC voltages, e.g., V1 to V4, by using the AC input power provided through the power lines 201 and 202 to supply them to designated components within the computer, thereby making the computer operable. A switched mode power supply which is one of many power supplies well known in the art may be advantageously used at the second power supply 220.

Once the DC voltages V1 to V4 are supplied to the designated components in the computer, a central processing unit (CPU) (not shown) incorporated in the control unit 180 instantly starts to execute booting process of the computer based on one of several booting algorithms well known in the art, wherein a register state value written in the second PCSG 160 is logic high. It should be noted that bit lengths of the register state value can be determined in advance based on the required performance of the computer. After executing the booting process, the control unit 180 outputs and provides a fourth address signal ADDS4 and a fourth data signal DATAS4 to the second PCSG 160 via the buses 101 and 102, thereby resetting the register state value written in the second PCSG 160 to a logic low.

When the computer is running, voice messages or data transmitted from the remotely located other communications terminal such as the telephone, the facsimile and the computer on the telephone lines 122 and 123, or a communication line 124 can be received by the control unit 180. The control unit 180 may include a random access memory (RAM), a read only memory (ROM), the CPU, a tone signal detector and a modem (not shown). It should be noted that CPU, RAM, ROM and modem (not shown) incorporated in the computer may be advantageously employed at the control unit 180.

When the voice messages or data is received, the received voice messages or data is stored in a first region or a second region of the RAM, wherein a ringing signal processing operation is carried out through the use of a conventional ringing signal processing algorithm to effectively receive the voice messages or data transmitted.

On the other hand, referring back to FIG. 2, the second logic low power control signal PCS2 from the second PCSG 160 shown in FIG. 1 on the line 161 is inverted by the inverter 145 to provide the second power control signal PCS2 of a logic high value, as the first buffer control signal BCS1 of a logic high value, to the gate of the first tri-state buffer 144. In response to the first logic high buffer control signal BCS1, the first tri-state buffer 144 is disabled; and, therefore, the pulse signal representing each of the following detected ringing signals from the line 128 is no longer relayed to the second tri-state buffer 146c and only the DC voltage Vs of +5V or logic high from the first supply 210 on the line 111 is relayed to the PDSG 130 shown in FIG. 1 through the resister 147 and the line 141.

Referring back to FIG. 1, if the first power selection signal PCS1 applied to the PCSG 130 through the line 120 suddenly becomes logic low, i.e., if the power on/off key in the computer is pressed by a user to halt the operation of the computer when it is running, it outputs a logic low signal having a very small interval to relay the same, as the power detection signal PDS of a logic low value, to the first PCSG 150 and the third tri-state buffer 142 via the line 131. In such a case, if the power on/off intention confirmation function is set by the computer user, the third tri-state buffer 142 is enabled in response to the third logic low buffer control signal BCS3 from the second D F/F 153 shown in FIG. 3; and, therefore, the logic low power detection signal PDS from the line 131 is relayed to the second PCSG 160, wherein the register state value of the second PCSG 160 is changed to a logic high. In a preferred embodiment of the invention, it is designed that the register state value can be monitored by the control unit 180, on a predetermined time basis, from the second PCSG 160 through the buses 101 and 102.

If the monitored register state value is logic high, the control unit 180 instantly outputs predetermined guide information prestored in the ROM thereof for the power on/off intention confirmation function, thereby providing the guide information onto a monitor (not shown) of the computer for the display thereof. In this case, in a preferred embodiment of the invention, exemplary guide information may read as follows: "please input or press a predetermined key on the keyboard of the computer to halt or continue the use of the computer".

In one of preferred embodiments of the invention, in case where a signal, indicating that the computer user wishes to halt the operation thereof, is applied from the keyboard to the control unit 180, it outputs and provides a fifth address signal ADDS5 and a fifth data signal DATAS5 to the second PCSG 160 via the lines 101 and 102. In response to the fifth address signal ADDS5 and the fifth data signal DATAS5, the second PCSG 160 resets the register state value written therein to a logic low and outputs a second power control signal PCS2 with a logic high value. Thereafter, the second logic high power control signal PCS2 so outputted is provided to the DPCSG 170 via the line 161, while the first power control signal PCS1 provided to the DPCSG 170 from the first PCSG is logic high. The DPCSG 170 generates, based on the two inputs applied thereto, the definitive power control signal DPCS of a logic high value to provide the same to the second power supply 220. In response to the logic high definitive power control signal DPCS, the power supply 220 is turned off; and, therefore, no voltage is supplied therefrom to the computer. As a result, no operation is performed in the computer.

In case where a signal, indicating that the computer user wishes to continue the operation thereof, is applied from the keyboard to the control unit 180, it issues a sixth address signal ADDS6 and a sixth data signal DATAS6 to the second PCSG 160 to reset the register state value written therein to a logic low. In this case, however, the second PCSG 160 outputs again the second logic low power control signal PCS2; and, consequently, the second power supply 220 continues to supply the DC voltages V1 to V4 to the designated components in the computer so that it can continuously operate.

In another preferred embodiment of the invention, in case where there is no answer to the guide information for a certain time period, it is designed that the inventive control system 100 can process based on either one of the two schemes as set forth above.

On the other hand, when the computer is running, the control unit 180 monitors the voice messages or data stored in the RAM, on a predetermined time basis, to check whether or not voice messages or data is regularly received and stored in the RAM. If the checked result is negative, i.e., no voice messages or data is received and stored in the RAM for a certain time period, the control unit 180 produces a seventh address signal ADDS7 and a seventh data signal DATAS7, thereby providing them to the second PCSG 160 via the buses 101 and 102, respectively. In response to the seventh address signal ADDS7 and the seventh data signal DATAS7, the second PCSG 160 resets the register state value written therein to a logic low and outputs the second power control signal PCS2 with a logic high value to the DPCSG 170 via the line 161. The DPCSG 170 generates the definitive power control signal DPCS with a logic high by utilizing the second logic high power control signal PCS2 to provide it to the second power supply 220, wherein the first power control signal PCS1 is still logic high. In response to the logic high definitive power control signal DPCS, the powedr supply 220 is turned off; and therefore, no voltage is supplied therefrom to the computer. Consequently, the computer is also turned off.

When the computer is running, if data, corresponding to a predetermined instruction such as CLOSE and the like, transmitted from the remotely located other computer through the line 124, or data corresponding to a tone signal transmitted from the remotely located telephone through the lines 122 and 123 is received and stored in the RAM to halt the computer operation, the control unit 180 issues an eighth address signal ADDS8 and an eighth data signal DATAS8 to the second PCSG 160. In this case, the second PCSG 160 also resets the register state value written thereon to a logic low and outputs the second power control signal PCS2 with a logic high value to the DPCSG 170 via the line 161. The DPCSG 170 produces the definitive power control signal DPCS with a logic high value from the first logic high power control signal PCS1 to provide it to the second power supply 220, wherein the first power control signal PCS1 is also logic high. In response to the logic high definitive power control signal DPCS, the power supply 220 is turned off; and therefore, no voltage is supplied therefrom to the computer, to thereby the computer being turned off. As shown above, the inventive control system is capable of effectively turning computer power supply on and off by utilizing a novel power control scheme of the present invention, thereby controlling on-off operations of the computer.

While the present invention has been shown and described with respect to the particular embodiments, it will be apparent to those skilled in the art that many changes and modifications may be made without departing from the spirit and scope of the invention as defined in the appended claims.

What is claimed is:

1. A computer incorporating therein a control system for controlling the operation of a power supply therein which supplies a plurality of DC output voltages to designated components of the computer to control on-off operations of the computer, wherein the control system comprises:

means for detecting a power selection signal, generated when a power on/off key of the computer is actuated to control the on-off operations of the computer, to provide a detected power selection signal as a power detection signal;

means for producing a first, a second and a third mode control signals when predetermined instructions corresponding to the signals are given by the computer user, respectively;

a first generation means, responsive to the first mode control signal, for generating a first power control signal and a selection control signal by using the power detection signal;

a second generation means, responsive to the selection control signal and the second and the third mode control signals, for generating a second power control signal by utilizing the power detection signal; and a combining means for logically combining the first and the second power control signals to generate a definitive power control signal and to provide it to the power supply, thereby selectively supplying the DC output voltages to the designated components of the computer to control the on-off operations of the computer.

2. The computer of claim 1, wherein the second generation means includes:

a first checking means for checking whether or not the power detection signal is in a first logic state indicating that the power on/off key has been actuated to initialize the operation of the computer when it is off; and for generating, if the power detection signal is in the first logic state, the second power control signal of the first logic state;

a second checking means for checking whether or not the power detection signal is in a second logic state indicating that the power on/off key has been actuated to halt the operation of the computer when it is running, and for selectively producing, if the power detection signal is in the second logic state, the second power control signal of the first logic or the second logic state in response to the selection control signal and the second and the third mode control signals; and means for coupling the power detection signal to the first checking means when the computer is off and, in response to the selection control signal, for selectively coupling the power detection signal to the second checking means when the computer is on.

3. The computer of claim 2, wherein the second checking means includes:

means for retrieving, if the power detection signal is in the second logic state, predetermined guide information from a memory of the computer to display the retrieved predetermined guide information;

means, in response to the second mode control signal provided after the display of the predetermined guide information, for generating the second power control signal of the first logic state to halt the operation of the computer; and means, in response to the third mode control signal provided after the display of the predetermined guide information, for generating the second power control signal of the second logic state to continue the operation of the computer.

4. The computer of claim 2, wherein each of the first, second and third mode control signals includes an address and a data signals.

5. The computer of claim 3, wherein the first generation means includes:

a latching means, in response to the address signal of the first mode control signal, for latching the data signal thereof to produce the selection control signal; and means, in response to the selection control signal, for selectively generating the first power control signal of the first or the second logic state by using the power detection signal.

6. The computer of claim 2, wherein the combining means is operated by employing an AND gate.

7. The computer of claim 5, wherein the latching means is operated by utilizing a D flip/flop.

8. The computer of claim 7, wherein the first generation means further includes means for generating and providing a clock signal by using the address signal to a clock input of the D flip/flop.

9. The computer of claim 8, wherein said means for generating and providing the clock signal is operated by utilizing a programmable array logic.

10. The computer of claim 1, wherein the power selection signal is generated when a power on/off key on a remote controller of the computer is actuated to control the on-off operations of the computer.

11. A computer incorporating therein a control system for controlling the operation of a power supply therein which supplies a plurality of DC output voltages to designated components of the computer to control on-off operations of the computer, wherein the control system comprises:

a first detection means for detecting a first power selection signal, generated when a power on/off key of the computer is actuated to control the on-off operations of the computer, to provide a first detected power selection signal;

a second detection means for detecting a ringing signal, generated when a user of any one of remotely located communications terminals calls a receiving communications terminal coupled with the computer to initialize the operation of the computer, to produce a detected ringing signal;

means for producing a first, a second, a third and a fourth mode control signals when corresponding predetermined instructions are given by the computer user, respectively;

a first generation means, responsive to the first mode control signal, for generating a second power selection signal by using the detected ringing signal;

a first combining means for logically combining the first detected power selection signal and the second generated power selection signal to produce a power detection signal;

a second generation means, responsive to the second mode control signal, for generating a first power control signal and a selection control signal by employing the power detection signal;

a third generation means, responsive to the selection control signal and the third and the fourth mode control signals, for generating a second power control signal by using the power detection signal; and a second combining means for logically combining the first and the second power control signals to generate and provide a definitive power control signal to the power supply, thereby selectively supplying the DC output voltages to the designated components of the computer to control the on-off operations of the computer.

12. The computer of claim 11, wherein the first generation means includes:

means for generating, if a ringing signal is detected when the computer is off, the third power selection signal of a first logic state in response to the first mode control signal; and means for generating, if ringing signals following the first are detected when the computer is on, the third power selection signal of a second logic state in response to the second power control signal.

13. The computer of claim 12, wherein the third generation means includes:

a first checking means for checking whether or not the power detection signal is in a first logic state indicating that the power on/off key has been actuated or a ringing signal has been detected to initialize the operation of the computer when it is off; and for generating, if the power detection signal is in the first logic state, the second power control signal of the first logic state;

a second checking means for checking whether or not the power detection signal is in a second logic state indicating that the power on/off key has been actuated to halt the operation of the computer when it is on, and for selectively producing, if the power detection signal is in the second logic state, the second power control signal of the first logic or the second logic state in response to the selection control signal and the third and the fourth mode control signals; and means for coupling the power detection signal to the first checking means when the computer is off and, in response to the selection control signal, for selectively coupling the power detection signal to the second checking means when the computer is on.

14. The computer of claim 13, wherein the second checking means includes:

means for retrieving, if the power detection signal is in the second logic state, predetermined guide information from a memory of the computer to display the retrieved predetermined guide information;

means, in response to the third mode control signal provided after the display of the predetermined guide information, for generating the second power control signal of the first logic state to halt the operation of the computer; and means, in response to the fourth mode control signal provided after the display of the predetermined guide information, for generating the second power control signal of the second logic state to continue the operation of the computer.

15. The computer of claim 14, wherein said second checking means further includes:

means for generating, if any of voice messages and data is inputted from any one of the remotely located communications terminals thereto when the computer is on, the second power control signal of the first logic state to continue the operation of the computer; and means for generating, if no information is inputted from any one of the remotely located communications terminals thereto for a predetermined time period, the second power control signal of the second logic state to halt the operation of the computer.

16. The computer of claim 12, wherein each of the first, second, third and fourth mode control signals includes an address and a data signals.

17. The computer of claim 16, wherein the second generation means includes:

a latching means for latching, in response to the address signal of the second mode control signal, the data signal thereof to produce the selection control signal; and means, in response to the selection control signal, for generating the first power control signal by utilizing the power detection signal.

18. The computer of claim 17, wherein the latching means is operated by utilizing a D flip/flop.

19. The computer of claim 17, wherein the second generation means further includes means for generating a clock signal by using the address signal and providing it to a clock input of the D flip/flop.

20. The computer of claim 19, wherein said means for generating and providing the clock signal is operated by utilizing a programmable array logic.

21. The computer of claim 12, wherein the second detection means is operated by using a photocoupler.

22. The computer of claim 12, wherein the first combining means is operated by using an AND gate.

23. The computer of claim 12, wherein the second combining means is operated by employing an AND gate.

24. The computer of claim 11, wherein the first power selection signal is generated when a power on/off key on a remote controller of the computer is actuated to control the on-off operations of the computer.

* * * * *